United States Patent
Kim et al.

(10) Patent No.: US 10,863,157 B2
(45) Date of Patent: Dec. 8, 2020

(54) GUIDED TONE MAPPING OF HIGH DYNAMIC RANGE VIDEO BASED ON A BEZIER CURVE FOR PRESENTATION ON A DISPLAY DEVICE

(71) Applicant: Samsung Electronics Co., Ltd., Suwon-si (KR)

(72) Inventors: Yeong-Taeg Kim, Irvine, CA (US); Li Tao, Irvine, CA (US); Pradeep Nagesh, Irvine, CA (US); Chenguang Liu, Tustin, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/504,025

(22) Filed: Jul. 5, 2019

(65) Prior Publication Data
US 2020/0014897 A1  Jan. 9, 2020

Related U.S. Application Data

(60) Provisional application No. 62/694,587, filed on Jul. 6, 2018.

(51) Int. Cl.
*H04N 9/68* (2006.01)
*G06T 5/00* (2006.01)
(Continued)

(52) U.S. Cl.
CPC .............. *H04N 9/68* (2013.01); *G06T 5/009* (2013.01); *H04N 9/77* (2013.01); *H04N 9/797* (2013.01); *G06T 2207/20208* (2013.01)

(58) Field of Classification Search
CPC ............ H04N 9/68; H04N 9/77; H04N 9/797; H04N 5/772; G06T 5/009; G06T 2207/20208
See application file for complete search history.

(56) References Cited

U.S. PATENT DOCUMENTS

| 5,363,477 A | 11/1994 | Kuragano et al. |
| 10,007,412 B2 | 6/2018 | Tao et al. |
| | (Continued) | |

FOREIGN PATENT DOCUMENTS

| JP | 2015517250 A | 6/2015 |
| WO | 2018/017596 A1 | 1/2018 |

OTHER PUBLICATIONS

U.S. Final Office Action for U.S. Appl. No. 14/986,563 (DMS15-VA09) dated Dec. 16, 2019.
(Continued)

*Primary Examiner* — Bryan Earles
(74) *Attorney, Agent, or Firm* — Sherman IP LLP; Kenneth L. Sherman; Hemavathy Perumal

(57) ABSTRACT

A method comprising receiving an input video signal comprising high dynamic range (HDR) video for presentation on a display device, and receiving metadata for the input video signal. The metadata comprises a first Bezier curve for tone mapping of the HDR video that fits a first peak luminance level. The method further comprises adjusting the first Bezier curve to a second Bezier curve for tone mapping of the HDR video that fits a second peak luminance level. The display device has the second peak luminance level, and the second peak luminance level is different from the first peak luminance level. The method further comprises producing a tone mapped video signal of the input video signal utilizing the second Bezier curve. The tone mapped video signal is provided to the display device for presentation.

20 Claims, 9 Drawing Sheets

(51) Int. Cl.
*H04N 9/797* (2006.01)
*H04N 9/77* (2006.01)

(56) References Cited

U.S. PATENT DOCUMENTS

| | | | |
|---|---|---|---|
| 2011/0050934 A1 | 3/2011 | Mitsunaga | |
| 2013/0022289 A1 | 1/2013 | Umeda et al. | |
| 2013/0106923 A1 | 5/2013 | Shields et al. | |
| 2013/0335438 A1* | 12/2013 | Ward | G06T 5/009 |
| | | | 345/589 |
| 2014/0002478 A1 | 1/2014 | Ballestad et al. | |
| 2015/0117791 A1 | 4/2015 | Mertens et al. | |
| 2016/0005349 A1 | 1/2016 | Atkins et al. | |
| 2016/0292834 A1* | 10/2016 | Tsuru | H04N 9/69 |
| 2016/0189409 A1 | 11/2016 | Aiba et al. | |
| 2016/0366386 A1 | 12/2016 | Douady-Pleven et al. | |
| 2016/0381363 A1 | 12/2016 | Tao et al. | |
| 2018/0007356 A1* | 1/2018 | Kadu | H04N 19/186 |
| 2018/0152686 A1* | 5/2018 | Wozniak | H04N 7/147 |
| 2018/0160089 A1* | 6/2018 | Yeung | G06T 1/20 |
| 2020/0005441 A1* | 1/2020 | Pytlarz | G06T 5/009 |

OTHER PUBLICATIONS

U.S. Advisory Action for U.S. Appl. No. 14/986,563 (DMS15-VA09) dated Feb. 28, 2020.

The Society of Motion Picture and Television Engineers, "Dynamic Metadata for Color, Volume Transform—Application #4," SMPTE Standard 2094-40, 2016, pp. 1-26, United States.

International Search Report and Written Opinion dated Jan. 2, 2017, PCT Application No. PCT/KR2016/010852, pp. 1-14, Korean IP Office.

Faraway, J. et al., "Modelling three-dimensional trajectories by using Bezier curves with application to hand motion," Apr. 2007, part 5, pp. 571-585, University of Bath, UK.

U.S. Non-Final Office Action for U.S. Appl. No. 14/993,944 (DMS15-VA08) dated Jun. 29, 2017.

U.S. Notice of Allowance for U.S. Appl. No. 14/993,944 (DMS15-VA08) dated Oct. 13, 2017.

U.S. Notice of Allowance for U.S. Appl. No. 14/993,944 (DMS15-VA08) dated Feb. 28, 2018.

U.S. Non-Final Office Action for U.S. Appl. No. 14/986,563 (DMS15-VA09) dated Apr. 19, 2018.

U.S. Final Office Action for U.S. Appl. No. 14/986,563 (DMS15-VA09) dated Sep. 10, 2018.

U.S. Advisory Action for U.S. Appl. No. 14/986,563 (DMS15-VA09) dated Nov. 23, 2018.

U.S. Non-Final Office Action for U.S. Appl. No. 14/986,563 (DMS15-VA09) dated Dec. 31, 2018.

U.S. Final Office Action for U.S. Appl. No. 14/986,563 (DMS15-VA09) dated Apr. 18, 2019.

U.S. Advisory Action for U.S. Appl. No. 14/986,563 (DMS15-VA09) dated Jul. 1, 2019.

U.S. Non-Final Office Action for U.S. Appl. No. 14/986,563 (DMS15-VA09) dated Aug. 8, 2019.

U.S. Final Office Action for U.S. Appl. No. 14/986,563 (DMS15-VA09) dated Apr. 2, 2020.

U.S. Advisory Action for U.S. Appl. No. 14/986,563 (DMS15-VA09) dated Jun. 18, 2020.

* cited by examiner

GUIDED TONE MAPPING OF HIGH DYNAMIC RANGE VIDEO BASED ON A BEZIER CURVE FOR PRESENTATION ON A DISPLAY DEVICE

CROSS-REFERENCE TO RELATED APPLICATIONS

The present application claims priority to U.S. Provisional Patent Application No. 62/694,587, filed on Jul. 6, 2018, hereby incorporated by reference in its entirety.

TECHNICAL FIELD

One or more embodiments generally relate to tone mapping of high dynamic range (HDR) video, in particular, a method and system for guided tone mapping of HDR video based on a Bezier curve for presentation on a display device.

BACKGROUND

High dynamic range (HDR) is a dynamic range higher than standard dynamic range (SDR). HDR video comprises a video signal that has greater bit depth, luminance, and color volume than SDR video. HDR techniques are used in image processing to reproduce a greater dynamic range of luminosity than is possible with SDR techniques. Tone mapping is an example HDR technique used to map one set of colors to another to approximate the appearance of HDR images in a medium that has a more limited dynamic range.

SUMMARY

One embodiment provides a method comprising receiving an input video signal comprising high dynamic range (HDR) video for presentation on a display device, and receiving metadata for the input video signal. The metadata comprises a first Bezier curve for tone mapping of the HDR video that fits a first peak luminance level. The method further comprises adjusting the first Bezier curve to a second Bezier curve for tone mapping of the HDR video that fits a second peak luminance level. The display device has the second peak luminance level, and the second peak luminance level is different from the first peak luminance level. The method further comprises producing a tone mapped video signal of the input video signal utilizing the second Bezier curve. The tone mapped video signal is provided to the display device for presentation.

Another embodiment provides a system comprising at least one processor and a non-transitory processor-readable memory device storing instructions that when executed by the at least one processor causes the at least one processor to perform operations. The operations include receiving an input video signal comprising HDR video for presentation on a display device, and receiving metadata for the input video signal. The metadata comprises a first Bezier curve for tone mapping of the HDR video that fits a first peak luminance level. The operations further include adjusting the first Bezier curve to a second Bezier curve for tone mapping of the HDR video that fits a second peak luminance level. The display device has the second peak luminance level, and the second peak luminance level is different from the first peak luminance level. The operations further include producing a tone mapped video signal of the input video signal utilizing the second Bezier curve. The tone mapped video signal is provided to the display device for presentation.

One embodiment provides a non-transitory processor-readable medium that includes a program that when executed by a processor performs a method comprising receiving an input video signal comprising HDR video for presentation on a display device, and receiving metadata for the input video signal. The metadata comprises a first Bezier curve for tone mapping of the HDR video that fits a first peak luminance level. The method further comprises adjusting the first Bezier curve to a second Bezier curve for tone mapping of the HDR video that fits a second peak luminance level. The display device has the second peak luminance level, and the second peak luminance level is different from the first peak luminance level. The method further comprises producing a tone mapped video signal of the input video signal utilizing the second Bezier curve. The tone mapped video signal is provided to the display device for presentation.

These and other aspects and advantages of one or more embodiments will become apparent from the following detailed description, which, when taken in conjunction with the drawings, illustrate by way of example the principles of the one or more embodiments.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which.

DETAILED DESCRIPTION

Figure 1:
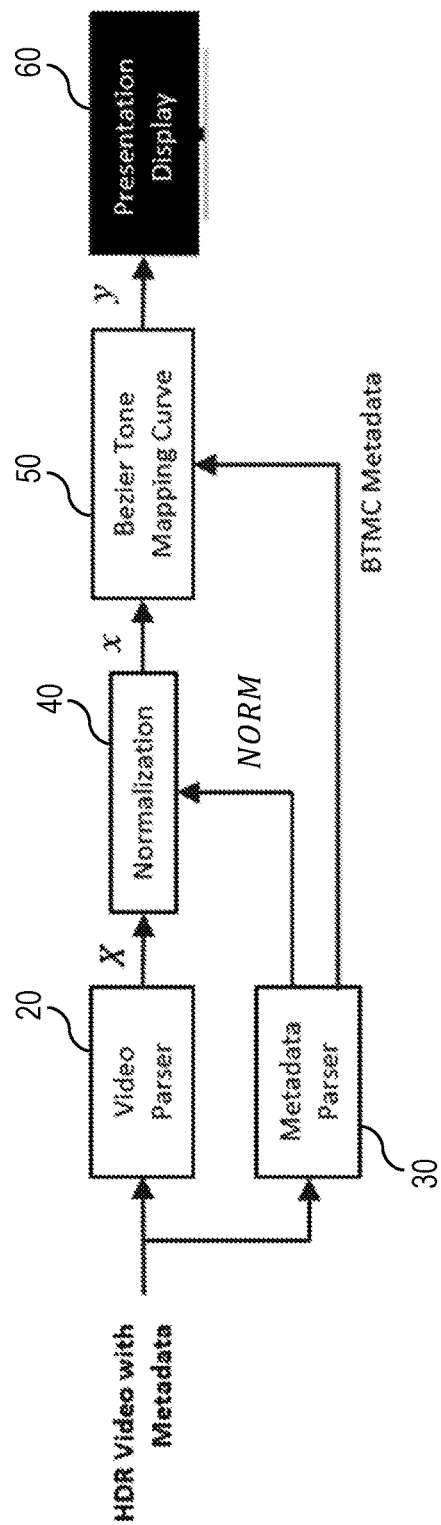
FIG. 1 illustrates a conventional tone mapping system implementing tone mapping of high dynamic range (HDR) video for presentation on a display device.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments generally relate to tone mapping of high dynamic range (HDR) video, in particular, a method and system for guided tone mapping of HDR video based on a Bezier curve for presentation on a display device. One embodiment provides a method comprising receiving an input video signal comprising HDR video for presentation on a display device, and receiving metadata for the input video signal. The metadata comprises a first Bezier curve for tone mapping of the HDR video that fits a first peak luminance level. The method further comprises adjusting (i.e., converting, changing, transforming, etc.) the first Bezier curve to a second Bezier curve for tone mapping of the HDR video that fits a second peak luminance level. The display device has the second peak luminance level, and the second peak luminance level is different from the first peak luminance level. The method further comprises producing a tone mapped video signal of the input video signal utilizing the second Bezier curve. The tone mapped video signal is provided to the display device for presentation.

Another embodiment provides a system comprising at least one processor and a non-transitory processor-readable memory device storing instructions that when executed by the at least one processor causes the at least one processor to perform operations. The operations include receiving an input video signal comprising HDR video for presentation on a display device, and receiving metadata for the input video signal. The metadata comprises a first Bezier curve for tone mapping of the HDR video that fits a first peak luminance level. The operations further include adjusting the first Bezier curve to a second Bezier curve for tone mapping of the HDR video that fits a second peak luminance level. The display device has the second peak luminance level, and the second peak luminance level is different from the first peak luminance level. The operations further include producing a tone mapped video signal of the input video signal utilizing the second Bezier curve. The tone mapped video signal is provided to the display device for presentation.

One embodiment provides a non-transitory processor-readable medium that includes a program that when executed by a processor performs a method comprising receiving an input video signal comprising HDR video for presentation on a display device, and receiving metadata for the input video signal. The metadata comprises a first Bezier curve for tone mapping of the HDR video that fits a first peak luminance level. The method further comprises adjusting the first Bezier curve to a second Bezier curve for tone mapping of the HDR video that fits a second peak luminance level. The display device has the second peak luminance level, and the second peak luminance level is different from the first peak luminance level. The method further comprises producing a tone mapped video signal of the input video signal utilizing the second Bezier curve. The tone mapped video signal is provided to the display device for presentation.

Let $T_{nit}$ generally denote a pre-determined/pre-defined target peak luminance level (i.e., target peak brightness or target maximum luminance), and let $D_{nit}$ generally denote a peak luminance level of a display device (i.e., peak brightness or maximum luminance of the display device).

When a HDR video is provided to a display device (e.g., a HDR display, a SDR display, etc.) for presentation, corresponding metadata for the HDR video is also provided together with the HDR video. Conventionally, the corresponding metadata for the HDR video comprises inputs including a Bezier curve for tone mapping of the HDR video. The Bezier curve, however, is pre-designed for a specific target peak luminance level $T_{nit}$ that is different from a peak luminance level $D_{nit}$ of the display device.

FIG. 1 illustrates a conventional tone mapping system 10 implementing tone mapping of HDR video for presentation on a display device (i.e., presentation display) 60. The system 10 comprises a video parser unit 20 configured to receive a HDR video (i.e., HDR content) for presentation on the display device 60 (e.g., a HDR display, a SDR display, etc.).

Let X generally denote a parsed HDR video. The video parser unit 20 is configured to parse the HDR video, resulting in a parsed HDR video X.

Together with the HDR video, the system 10 is further configured to receive, via a metadata parser unit 30, corresponding metadata for the HDR video. For each scene of the HDR video, the corresponding metadata comprises scene statistical information (SSI) corresponding to the scene and Bezier tone mapping curve (BTMC) metadata corresponding to the scene. BTMC metadata corresponding to a scene comprises a knee point $\vec{k}$ corresponding to the scene and a vector $\vec{p}$ of $N^{th}$ order Bezier curve anchors (i.e., coefficients) corresponding to the scene, wherein $$\vec{k} = \begin{pmatrix} k_x \\ k_y \end{pmatrix}, \vec{p} = (p_1, p_2, \ldots, p_{N-1})^T,$$

and T denotes a transpose of a vector.

Let NORM generally denote a normalization factor. The metadata parser unit 30 is configured to compute, based on SSI included in the corresponding metadata for the HDR video, a normalization factor NORM.

Let x generally denote a normalized HDR video. The system 10 comprises a normalization unit 40 configured to: (1) receive the parsed HDR video X from the video parser unit 20, (2) receive the computed normalization factor NORM from the metadata parser unit 30, and (3) perform, based on the normalization factor NORM, a normalization operation on the parsed HDR video X to produce a normalized HDR video x. In some embodiments, the normalization operation performed by the normalization unit 40 is expressed in accordance with equation (1) provided below:

$$x = \min\left(\frac{X}{\text{NORM}}, 1\right). \tag{1}$$

The system 10 comprises a BTMC unit 50 configured to: (1) receive the normalized HDR video x from the normalization unit 40, (2) receive BTMC metadata from the metadata parser unit 30, and (3) perform, based on the BTMC metadata, a tone mapping operation on the normalized HDR video x to produce a tone mapped HDR video y. In one embodiment, the resulting tone mapped HDR video y is provided, as output, to the display device 60 for presentation.

The tone mapping operation performed by the system 10 (via the BTMC unit 50) is expressed in accordance with equation (2) provided below:

$$y = \begin{cases} \frac{k_y}{k_x}x, & 0 \le x \le k_x \\ k_y + (1-k_y)B\left(\frac{x-k_x}{1-k_x}\right), & k_x < x \le 1 \end{cases} \quad (2)$$

wherein y is expressed as a linear equation $$\frac{k_y}{k_x}x$$

if $0 \le x \le k_x$, y is expressed as a non-linear equation $$k_y + (1-k_y)B\left(\frac{x-k_x}{1-k_x}\right)$$

if $k_x < x \le 1$, and B denotes a function for a Bezier curve expressed in accordance with equation (3) provided below:

$$B(t) = \sum_{j=0}^{N} \binom{N}{j} t^j (1-t)^{N-j} p_j, \quad (3)$$

wherein t denotes an input to the function B, t is a normalized signal value (in the normalized range [0,1]) of the HDR video (e.g., a normalized pixel value of the HDR video), $p_0=0$, and $p_N=1$.

The Bezier curve B(t) utilized by the system 10 is pre-designed for a specific target peak luminance level $T_{nit}$. The target peak luminance level $T_{nit}$ is included in the corresponding metadata for the HDR video. This target peak luminance level $T_{nit}$, however, is not the same as a peak luminance level $D_{nit}$ of the display device 60. The corresponding metadata for the HDR video may include a reference target luminance level of a reference monitor used (e.g., by a studio) to grade or generate the HDR video; the reference target luminance level is different from the peak luminance level $D_{nit}$ of the display device 60.

Figure 2:
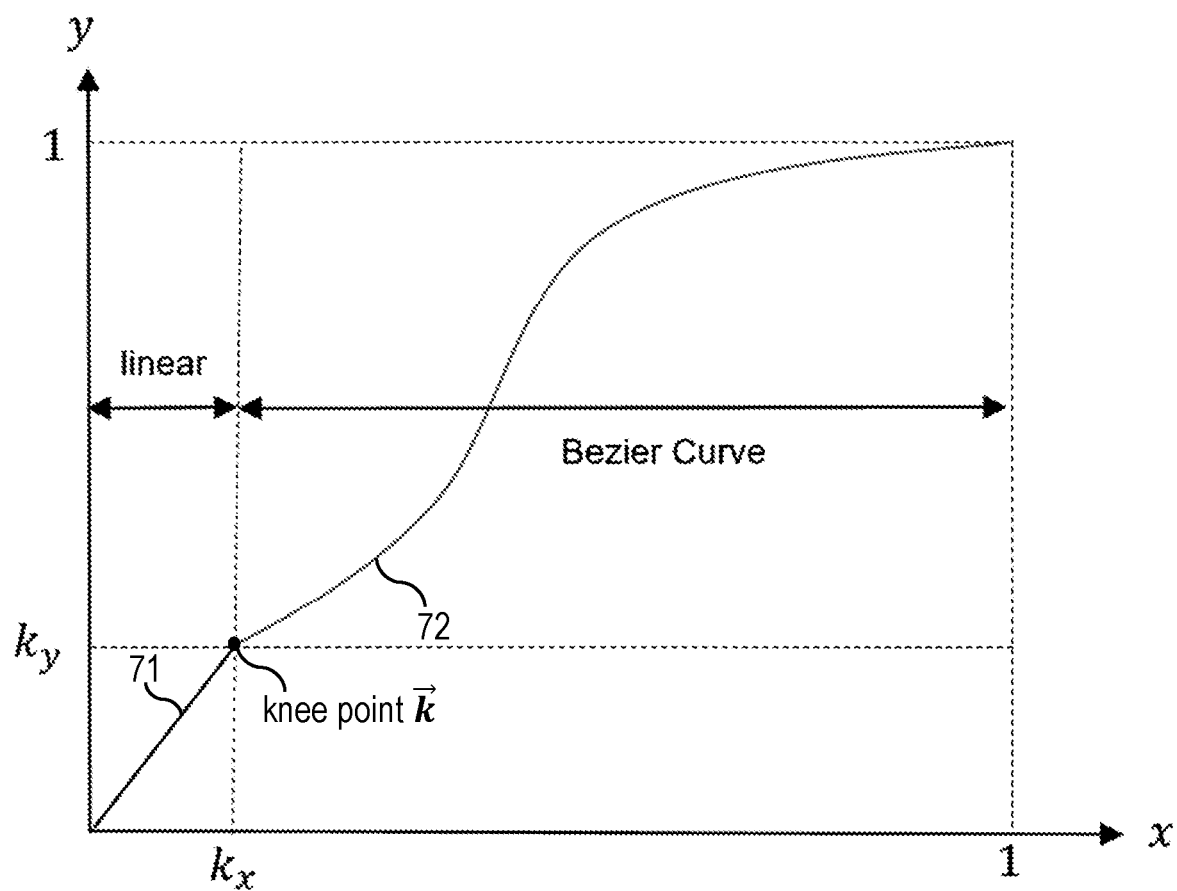
FIG. 2 is a graph illustrating a tone mapping operation performed by the conventional tone mapping system in FIG. 1.

FIG. 2 is a graph 70 illustrating a tone mapping operation performed by the conventional tone mapping system 10. A horizontal axis of the graph 70 represents the normalized HDR video x. A vertical axis of the graph 70 represents the tone mapped HDR video y. The graph 70 comprises each of the following: (1) a straight line 71 representing the linear equation $$\frac{k_y}{k_x}x$$

applied during the tone mapping operation if $0 \le x \le k_x$, and (2) a Bezier curve 72 representing the non-linear equation $$k_y + (1-k_y)B\left(\frac{x-k_x}{1-k_x}\right)$$

applied during the tone mapping operation if $k_x < x \le 1$.

Conventional solutions implementing tone mapping of HDR video for presentation on a display device do not factor into account a peak luminance level $D_{nit}$ of the display device.

One or more embodiments provide a method and system for guided tone mapping of HDR video for presentation on a display device that involves converting (i.e., adjusting, changing, transforming, etc.) an incoming/input Bezier curve pre-designed for a specific target peak luminance level $T_{nit}$ to an adjusted Bezier curve that fits a peak luminance level $D_{nit}$ of the display device.

Figure 3:
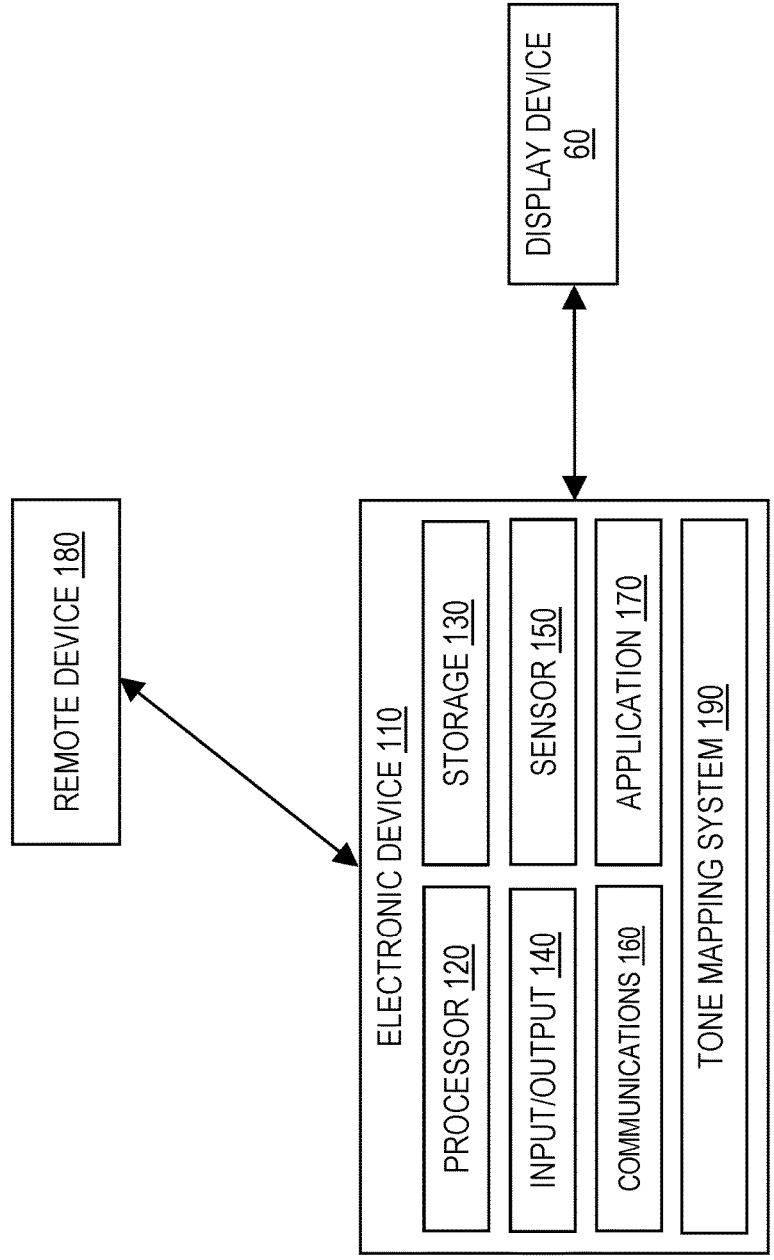
FIG. 3 illustrates an example computing architecture for implementing guided tone mapping of HDR video for presentation on a display device, in one or more embodiments.

FIG. 3 illustrates an example computing architecture 100 for implementing guided tone mapping of HDR video for presentation on a display device 60, in one or more embodiments. The computing architecture 100 comprises an electronic device 110 including resources, such as one or more processor units 120 and one or more storage units 130. One or more applications may execute/operate on the electronic device 110 utilizing the resources of the electronic device 110.

In one embodiment, the one or more applications on the electronic device 110 include a tone mapping system 190 configured to implement guided tone mapping of HDR video for presentation on a display device 60 integrated in or coupled to the electronic device 110. As described in detail later herein, the tone mapping system 190 is configured to: (1) receive, as inputs, a HDR video (i.e., HDR content) and corresponding metadata for the HDR video, wherein the corresponding metadata comprises an incoming/input Bezier curve for tone mapping of the HDR video that is pre-designed for a specific target peak luminance level $T_{nit}$, (2) convert (i.e., adjust, change, transform, etc.) the incoming/input Bezier curve to an adjusted Bezier curve that fits a peak luminance level $D_{nit}$ of the display device 60, (3) adjust/customize the HDR video for the peak luminance level $D_{nit}$ of the display device 60 by performing tone mapping on the HDR video utilizing the adjusted Bezier curve, and (4) provide, as output, the resulting tone mapped HDR video to the display device 60 for presentation.

Examples of an electronic device 110 include, but are not limited to, a television (e.g., a smart television), a mobile electronic device (e.g., a tablet, a smart phone, a laptop, etc.), a set-top box, etc.

In one embodiment, the electronic device 110 comprises one or more sensor units 150 integrated in or coupled to the electronic device 110, such as a camera, a microphone, a GPS, a motion sensor, etc. A sensor unit 150 may be utilized to capture content and/or sensor-based contextual information. For example, an application on the electronic device 110 may utilize at least one sensor unit 150 to capture content and/or sensor-based contextual information, such as a microphone for audio data (e.g., voice commands, ambient noise, etc.), a camera for image data (e.g., still and/or video images of an environment surrounding the electronic device 110, etc.), a GPS for location data (e.g., location coordinates), a motion sensor for proximity/motion data (e.g., data indicative of a user within proximity of the electronic device 110), etc.

In one embodiment, the electronic device 110 comprises one or more I/O units 140 integrated in or coupled to the electronic device 110. In one embodiment, the one or more I/O units 140 include, but are not limited to, a physical user interface (PUI) and/or a GUI, such as a keyboard, a keypad, a touch interface, a touch screen, a knob, a button, a display screen, etc. In one embodiment, a user can utilize at least one I/O unit 140 to configure one or more user preferences, configure one or more parameters (e.g., user permissions), provide input (e.g., a search query), etc.

In one embodiment, the one or more applications on the electronic device 110 may further include one or more software mobile applications 170 loaded onto or downloaded to the electronic device 110, such as a camera application, a social media application, a video streaming application, etc. A software mobile application 170 on the electronic device 110 may exchange data with the system 190.

In one embodiment, the electronic device 110 comprises a communications unit 160 configured to exchange data with one or more remote devices 180 (e.g., receiving a video stream from a remote device 180) and/or the display device 60 (e.g., receiving display characteristics of the display device 60 including the peak luminance level $D_{nit}$) over a communications network/connection (e.g., a wireless connection such as a Wi-Fi connection or a cellular data connection, a wired connection, or a combination of the two). The communications unit 160 may comprise any suitable communications circuitry operative to connect to a communications network and to exchange communications operations and media between the electronic device 110 and other devices connected to the same communications network. The communications unit 160 may be operative to interface with a communications network using any suitable communications protocol such as, for example, Wi-Fi (e.g., an IEEE 802.11 protocol), Bluetooth®, high frequency systems (e.g., 900 MHz, 2.4 GHz, and 5.6 GHz communication systems), infrared, GSM, GSM plus EDGE, CDMA, quadband, and other cellular protocols, VOIP, TCP-IP, or any other suitable protocol.

For example, a remote device 180 may comprise a remote server (e.g., a computer, device, or program that manages network resources, etc.) providing an online platform for hosting one or more online services (e.g., a video streaming service, etc.) and/or distributing one or more software mobile applications 170. As another example, the system 190 may be loaded onto or downloaded to the electronic device 110 from a remote device 180 that maintains and distributes updates for the system 190. As yet another example, a remote device 180 may comprise a cloud computing environment providing shared pools of configurable computing system resources and higher-level services.

Figure 4:
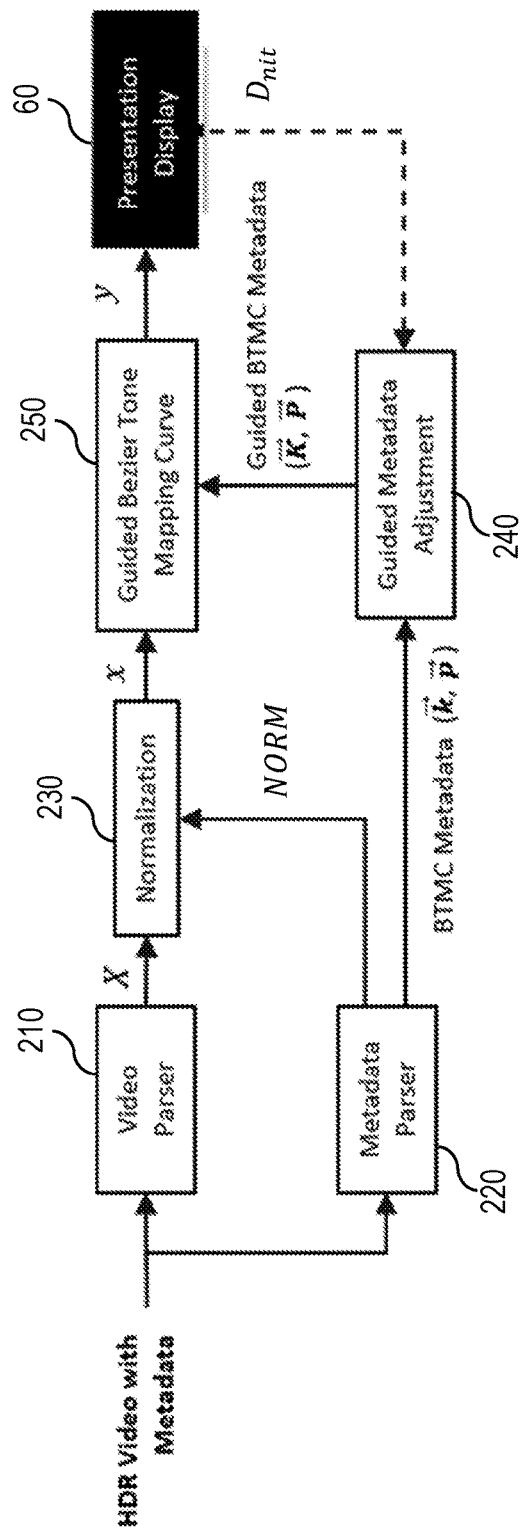
FIG. 4 illustrates an example tone mapping system for implementing guided tone mapping of HDR video for presentation on a display device, in one or more embodiments.

FIG. 4 illustrates an example tone mapping system 200 for implementing guided tone mapping of HDR video for presentation on a display device 60, in one or more embodiments. In one embodiment, the tone mapping system 190 in FIG. 3 is implemented as the tone mapping system 200. In one embodiment, the system 200 comprises a video parser unit 210 configured to: (1) receive, as input, a HDR video for presentation on a display device 60, and (2) parse the HDR video to produce a parsed HDR video X.

In one embodiment, the system 200 comprises a metadata parser unit 220 configured to: (1) receive, as input, corresponding metadata for the HDR video, wherein the corresponding metadata comprises, for each scene of the HDR video, SSI and BTMC metadata ($\vec{K}$, $\vec{p}$) corresponding to the scene, and (2) parse the corresponding metadata to obtain a normalization factor NORM and each BTMC metadata ($\vec{K}$, $\vec{p}$) corresponding to each scene of the HDR video. The system 200 receives the HDR video together with the corresponding metadata. Each BTMC metadata ($\vec{K}$, $\vec{p}$) corresponding to each scene of the HDR video defines an incoming/input Bezier curve for tone mapping of the HDR video that is pre-designed for a specific target peak luminance level $T_{nit}$. The target peak luminance level $T_{nit}$ is included in the corresponding metadata for the HDR video. In one embodiment, the corresponding metadata for the HDR video includes a reference target luminance level of a reference monitor used (e.g., by a studio) to grade or generate the HDR video; the reference target luminance level is different from the peak luminance level $D_{nit}$ of the display device 60.

In one embodiment, the metadata parser unit 220 is configured to compute the normalization factor NORM based on SSI corresponding to each scene of the HDR video.

In one embodiment, the system 200 comprises a normalization unit 230 configured to: (1) receive the parsed HDR video X from the video parser unit 210, (2) receive the normalization factor NORM from the metadata parser unit 220, and (3) perform a normalization operation on the parsed HDR video X utilizing the normalization factor NORM to produce a normalized HDR video x.

In one embodiment, the normalization operation performed by the normalization unit 230 is expressed in accordance with equation (1) provided above.

In one embodiment, the system 200 comprises a guided metadata adjustment unit 240 configured to convert the incoming/input Bezier curve to an adjusted Bezier curve that fits a peak luminance level $D_{nit}$ of the display device 60 by adjusting respective BTMC metadata ($\vec{K}$, $\vec{p}$) corresponding to each scene of the HDR video to respective guided (i.e., adjusted) BTMC metadata ($\vec{K}$, $\vec{P}$) corresponding to the scene. Specifically, in one embodiment, the guided metadata adjustment unit 240 is configured to: (1) receive BTMC metadata ($\vec{K}$, $\vec{p}$) corresponding to a scene of the HDR video from the metadata parser unit 220, (2) receive the peak luminance level $D_{nit}$ of the display device 60 (e.g., from the display device 60 or as input provided via an I/O unit 140), and (3) adjust the BTMC metadata ($\vec{K}$, $\vec{p}$) based on the peak luminance level $D_{nit}$ and the specific target peak luminance level $T_{nit}$ to produce the guided (i.e., adjusted) BTMC metadata ($\vec{K}$, $\vec{P}$) corresponding to the scene.

Guided BTMC metadata ($\vec{K}$, $\vec{P}$) corresponding to each scene of the HDR video comprises a guided knee point $\vec{K}$ corresponding to the scene and a vector $\vec{P}$ of $N^{th}$ order guided Bezier curve anchors (i.e., coefficients) corresponding to the scene, wherein $$\vec{K} = \begin{pmatrix} K_x \\ K_y \end{pmatrix}, \text{ and } \vec{P} = (P_1, P_2, \ldots, P_{N-1})^T.$$

In one embodiment, the guided metadata adjustment unit 240 is configured to compare the peak luminance level $D_{nit}$ against the specific target peak luminance level $T_{nit}$, and adjust BTMC metadata ($\vec{K}$, $\vec{p}$) corresponding to each scene of the HDR video in accordance with the comparison. In one embodiment, if the peak luminance level $D_{nit}$ is less than or equal to the specific target peak luminance level $T_{nit}$ (i.e., condition of $D_{nit} \leq T_{nit}$), the guided metadata adjustment unit 240 is configured to produce a guided knee point $\vec{K}$ corresponding to a scene of the HDR video in accordance with equation (4) provided below:

$$\vec{K} = (\alpha, \beta) \cdot \begin{pmatrix} \vec{k} \\ \vec{K_0} \end{pmatrix}, \quad (4)$$

wherein • denotes a dot product of two vectors, $\vec{K}_0$ is a pre-determined/pre-defined knee point, and $\alpha$ and $\beta$ are parameters that satisfy one or more constraints. Examples of a pre-determined/pre-defined knee point $\vec{K}_0$ include, but are not limited to, $$\begin{pmatrix} 0 \\ 0 \end{pmatrix}.$$

Figure 5A:
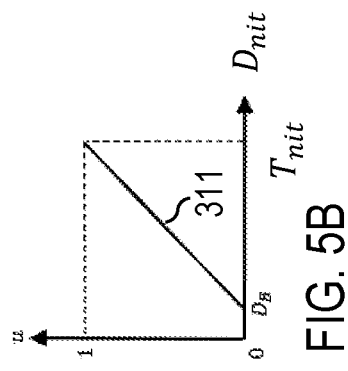
FIG. 5A is a graph illustrating a parameter $\alpha$ if a peak luminance level $D_{nit}$ is less than or equal to a specific target peak luminance level $T_{nit}$, in one or more embodiments.
Figure 6A:
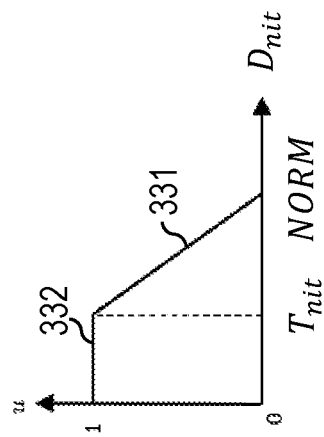
FIG. 6A is a graph illustrating the parameter $\alpha$ if the specific target peak luminance level $T_{nit}$ is less than the peak luminance level $D_{nit}$, in one or more embodiments.

In one embodiment, the parameters $\alpha$ and $\beta$ satisfy the following constraints: (1) $\alpha + \beta = 1$, (2) $0 \leq \alpha$, (3) $\beta \leq 1$, and (4) one of the parameters $\alpha$ and $\beta$ is a mixing parameter that is designed as a function of the peak luminance level $D_{nit}$ (e.g., a linear function as shown in FIG. 5A or FIG. 6A).

In one embodiment, if the peak luminance level $D_{nit}$ is less than or equal to the specific target peak luminance level $T_{nit}$ (i.e., condition of $D_{nit} \leq T_{nit}$), the guided metadata adjustment unit 240 is configured to produce a vector $\vec{P}$ of $N^{th}$ order guided Bezier curve anchors corresponding to a scene of the HDR video in accordance with equation (5) provided below:

$$\vec{P} = (u, v) \cdot \begin{pmatrix} \vec{p} \\ \vec{P_0} \end{pmatrix}, \quad (5)$$

wherein $\vec{P}_0$ is a pre-determined/pre-defined vector of $N^{th}$ order Bezier curve anchors, and u and v are parameters that satisfy one or more constraints. Examples of a pre-determined/pre-defined vector $\vec{P}_0$ of $N^{th}$ order Bezier curve anchors include, but are not limited to, $(1, 1, \ldots, 1)^T$.

Figure 5B:
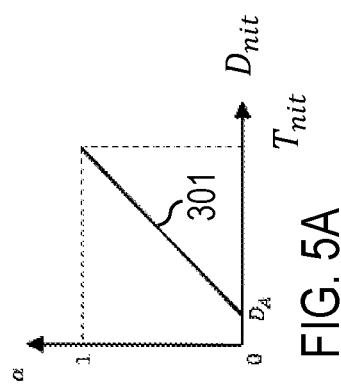
FIG. 5B is a graph illustrating a parameter u if the peak luminance level $D_{nit}$ is less than or equal to the specific target peak luminance level $T_{nit}$, in one or more embodiments.
Figure 6B:
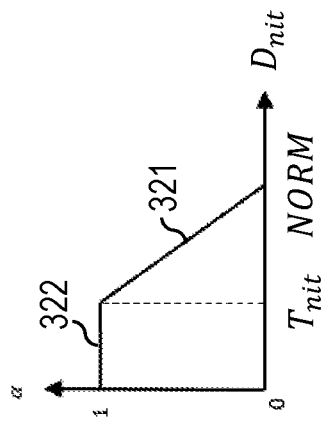
FIG. 6B is a graph illustrating the parameter u if the specific target peak luminance level $T_{nit}$ is less than the peak luminance level $D_{nit}$, in one or more embodiments.

In one embodiment, the parameters u and v satisfy the following constraints: (1) $u + v = 1$, (2) $0 \leq u$, (3) $v \leq 1$, and (4) one of the parameters u and v is a control parameter that is designed as a function of the peak luminance level $D_{nit}$ (e.g., a linear function as shown in FIG. 5B or FIG. 6B).

In one embodiment, if the specific target peak luminance level $T_{nit}$ is less than the peak luminance level $D_{nit}$ (i.e., condition of $T_{nit} < D_{nit}$), the guided metadata adjustment unit 240 is configured to produce a guided knee point $\vec{K}$ corresponding to a scene of the HDR video in accordance with equation (6) provided below:

$$\vec{K} = (\alpha, \beta) \cdot \begin{pmatrix} \vec{k} \\ \vec{K_1} \end{pmatrix}, \quad (6)$$

wherein $\vec{K}_1$ is a pre-determined/pre-defined knee point, and the parameters $\alpha$ and $\beta$ satisfy one or more constraints (e.g., the constraints specified above). Examples of a pre-determined/pre-defined knee point $\vec{K}_1$ include, but are not limited to, $$\begin{pmatrix} 0.5 \\ 0.5 \end{pmatrix}.$$

In one embodiment, if the specific target peak luminance level $T_{nit}$ is less than the peak luminance level $D_{nit}$ (i.e., condition of $T_{nit} < D_{nit}$), the guided metadata adjustment unit 240 is configured to produce a vector $\vec{P}_0$ of $N^{th}$ order guided Bezier curve anchors corresponding to a scene of the HDR video in accordance with equation (7) provided below:

$$\vec{P} = (u, v) \cdot \begin{pmatrix} \vec{p} \\ \vec{P_L} \end{pmatrix}, \quad (7)$$

wherein $\vec{P}_L$ is a pre-determined/pre-defined vector of $N^{th}$ order Bezier curve anchors, and u and v are parameters that satisfy one or more constraints (e.g., the constraints specified above). Examples of a pre-determined/pre-defined vector $\vec{P}_L$ of $N^{th}$ order Bezier curve anchors include, but are not limited to, $$\left(0, \frac{1}{N}, \ldots, \frac{N-1}{N}, 1\right)^T.$$

In one embodiment, if the specific target peak luminance level $T_{nit}$ is less than the peak luminance level $D_{nit}$ (i.e., $T_{nit} < D_{nit}$), the parameter u is designed as a linear function of the peak luminance level $D_{nit}$, wherein u=1 if the peak luminance level $D_{nit}$ is less than or equal to the specific target peak luminance level $T_{nit}$ (i.e., $D_{nit} \leq T_{nit}$), and u=0 if the peak luminance level $D_{nit}$ is equal to or greater than the normalization factor NORM (i.e., $D_{nit} \geq$ NORM).

In another embodiment, instead of using $D_{nit} \leq T_{nit}$ and $T_{nit} < D_{nit}$ as conditions, the guided metadata adjustment unit 240 uses $D_{nit} < T_{nit}$ and $T_{nit} \leq D_{nit}$ as conditions instead.

In one embodiment, the system 200 comprises a guided BTMC unit 250 configured to: (1) receive the normalized HDR video x from the normalization unit 230, (2) receive guided BTMC metadata ($\vec{K}, \vec{P}$) corresponding to a scene of the HDR video from the guided metadata adjustment unit 240, and (3) perform, based on the guided BTMC metadata ($\vec{K}, \vec{P}$), a tone mapping operation on the normalized HDR video x to produce tone mapped HDR video y. In one embodiment, the resulting tone mapped HDR video y is provided, as output, to the display device 60 for presentation.

In one embodiment, the tone mapping operation performed by the guided BTMC unit 250 is expressed in accordance with equation (8) provided below:

$$y = \begin{cases} \dfrac{K_y}{K_x}x, & 0 \le x \le K_x \\ K_y + (1-K_y)B\left(\dfrac{x-K_x}{1-K_x}\right), & K_x < x \le 1 \end{cases} \quad (8)$$

wherein y is expressed as a linear equation $$\dfrac{K_y}{K_x}x$$

if $0 \le x \le K_x$, y is expressed as a non-linear equation $$K_y + (1-K_y)B\left(\dfrac{x-K_x}{1-K_x}\right)$$

if $K_x < x \le 1$, and B denotes a Bezier curve expressed in accordance with equation (9) provided below:

$$B(t) = \sum_{j=0}^{N} \binom{N}{j} t^j (1-t)^{N-j} P_j, \quad (9)$$

wherein $P_0=0$, and $P_N=1$.

Unlike the BTMC unit 50 in FIG. 1, the Bezier curve B(t) utilized by the guided BTMC unit 250 fits the peak luminance level $D_{nit}$ of the display device 60.

In one embodiment, to reduce or avoid occurrence of one or more banding artifacts in the tone mapped HDR video y around the guided knee point $\vec{K}$ (i.e., when $x=K_x$), the guided BTMC unit 250 ensures/maintains continuity of slope (i.e., preserves tangent continuity) of the Bezier curve B(t) at the guided knee point $\vec{K}$ by adjusting a guided Bezier curve anchor $P_1$ based on a constraint expressed in accordance with equation (10) provided below:

$$P_1 = \dfrac{1}{N} \cdot \dfrac{K_y}{K_x} \cdot \dfrac{1-K_x}{1-K_y}, \quad (10)$$

wherein the constraint is derived from a condition expressed in accordance with equation (11) provided below:

$$\left. \dfrac{d}{dx}\left(K_y + (1-K_y) \cdot B_N\left(\vec{P}, \dfrac{x-K_x}{1-K_x}\right)\right)\right|_{x=K_x} = \dfrac{K_y}{K_x}, \quad (11)$$

wherein $B_N$ denotes a normalized Bezier curve.

In one embodiment, if the peak luminance level $D_{nit}$ is less than or equal to the specific target peak luminance level $T_{nit}$ (i.e., condition of $D_{nit} \le T_{nit}$), the parameter α is designed as a linear function of the peak luminance level $D_{nit}$.

FIG. 5A is a graph 300 illustrating the parameter α if the peak luminance level $D_{nit}$ is less than or equal to the specific target peak luminance level $T_{nit}$ (i.e., condition of $D_{nit} \le T_{nit}$), in one or more embodiments. A horizontal axis of the graph 300 represents the peak luminance level $D_{nit}$. A vertical axis of the graph 300 represents the parameter α. The graph 300 comprises a straight line 301 representing a linear function of the peak luminance level $D_{nit}$ that the parameter α is designed as if the peak luminance level $D_{nit}$ is less than or equal to the specific target peak luminance level $T_{nit}$. As shown in FIG. 5A, α=0 if the peak luminance level $D_{nit}$ is less than or equal to a pre-determined/pre-defined value $D_A$ (i.e., $D_{nit} \le D_A$). As further shown in FIG. 5A, 0<α<1 if the peak luminance level $D_{nit}$ is greater than the pre-determined/pre-defined value $D_A$ and less than the specific target peak luminance level $T_{nit}$ (i.e., $D_A<D_{nit}<T_{nit}$). As further shown in FIG. 5A, α=1 if the peak luminance level $D_{nit}$ is equal to the specific target peak luminance level $T_{nit}$ (i.e., $D_{nit}=T_{nit}$).

In one embodiment, if the peak luminance level $D_{nit}$ is less than or equal to the specific target peak luminance level $T_{nit}$ (i.e., condition of $D_{nit} \le T_{nit}$), the parameter u is designed as a linear function of the peak luminance level $D_{nit}$.

FIG. 5B is a graph 310 illustrating the parameter u if the peak luminance level $D_{nit}$ is less than or equal to the specific target peak luminance level $T_{nit}$ (i.e., condition of $D_{nit} \le T_{nit}$), in one or more embodiments. A horizontal axis of the graph 310 represents the peak luminance level $D_{nit}$. A vertical axis of the graph 310 represents the parameter u. The graph 310 comprises a straight line 311 representing a linear function of the peak luminance level $D_{nit}$ that the parameter u is designed as if the peak luminance level $D_{nit}$ is less than or equal to the specific target peak luminance level $T_{nit}$. As shown in FIG. 5B, u=0 if the peak luminance level $D_{nit}$ is less than or equal to a pre-determined/pre-defined value $D_B$ (i.e., $D_{nit} \le D_B$). As further shown in FIG. 5B, 0<u<1 if the peak luminance level $D_{nit}$ is greater than the pre-determined/pre-defined value $D_B$ and less than the specific target peak luminance level $T_{nit}$ (i.e., $D_B<D_{nit}<T_{nit}$). As further shown in FIG. 5B, u=1 if the peak luminance level $D_{nit}$ is equal to the specific target peak luminance level $T_{nit}$ (i.e., $D_{nit}=T_{nit}$).

In one embodiment, if the specific target peak luminance level $T_{nit}$ is less than the peak luminance level $D_{nit}$ (i.e., condition of $T_{nit}<D_{nit}$), the parameter α is designed as a linear function of the peak luminance level $D_{nit}$.

FIG. 6A is a graph 320 illustrating the parameter α if the specific target peak luminance level $T_{nit}$ is less than the peak luminance level $D_{nit}$ (i.e., condition of $T_{nit}<D_{nit}$), in one or more embodiments. A horizontal axis of the graph 320 represents the peak luminance level $D_{nit}$. A vertical axis of the graph 320 represents the parameter α. The graph 320 comprises: (1) a horizontal line 322 representing α=1 if the peak luminance level $D_{nit}$ is less than or equal to the specific target peak luminance level $T_{nit}$ (i.e., $D_{nit} \le T_{nit}$), and (2) a straight line 321 representing a linear function of the peak luminance level $D_{nit}$ that the parameter α is designed as if the specific target peak luminance level $T_{nit}$ is less than the peak luminance level $D_{nit}$ (i.e., $T_{nit}<D_{nit}$). As shown in FIG. 6A, 0<α<1 if the peak luminance level $D_{nit}$ is greater than the specific target peak luminance level $T_{nit}$ and less than the normalization factor NORM (i.e., $T_{nit}<D_{nit}<NORM$). As further shown in FIG. 6A, α=0 if the peak luminance level $D_{nit}$ is equal to or greater the normalization factor NORM (i.e., $D_{nit} \ge NORM$).

In one embodiment, if the specific target peak luminance level $T_{nit}$ is less than the peak luminance level $D_{nit}$ (i.e., condition of $T_{nit}<D_{nit}$), the parameter u is designed as a linear function of the peak luminance level $D_{nit}$.

FIG. 6B is a graph 330 illustrating the parameter u if the specific target peak luminance level $T_{nit}$ is less than the peak luminance level $D_{nit}$ (i.e., condition of $T_{nit}<D_{nit}$), in one or more embodiments. A horizontal axis of the graph 330 represents the peak luminance level $D_{nit}$. A vertical axis of the graph 330 represents the parameter u. The graph 330 comprises: (1) a horizontal line 332 representing u=1 if the peak luminance level $D_{nit}$ is less than or equal to the specific target peak luminance level $T_{nit}$ (i.e., $D_{nit} \leq T_{nit}$), and (2) a straight line 331 representing a linear function of the peak luminance level $D_{nit}$ that the parameter u is designed as if the specific target peak luminance level $T_{nit}$ is less than the peak luminance level $D_{nit}$ (i.e., $T_{nit} < D_{nit}$). As shown in FIG. 6B, $0 < u < 1$ if the peak luminance level $D_{nit}$ is greater than the specific target peak luminance level $T_{nit}$ and less than the normalization factor NORM (i.e., $T_{nit} < D_{nit} < NORM$). As further shown in FIG. 6B, u=0 if the peak luminance level $D_{nit}$ is equal to or greater the normalization factor NORM (i.e., $D_{nit} \geq NORM$).

Figure 7:
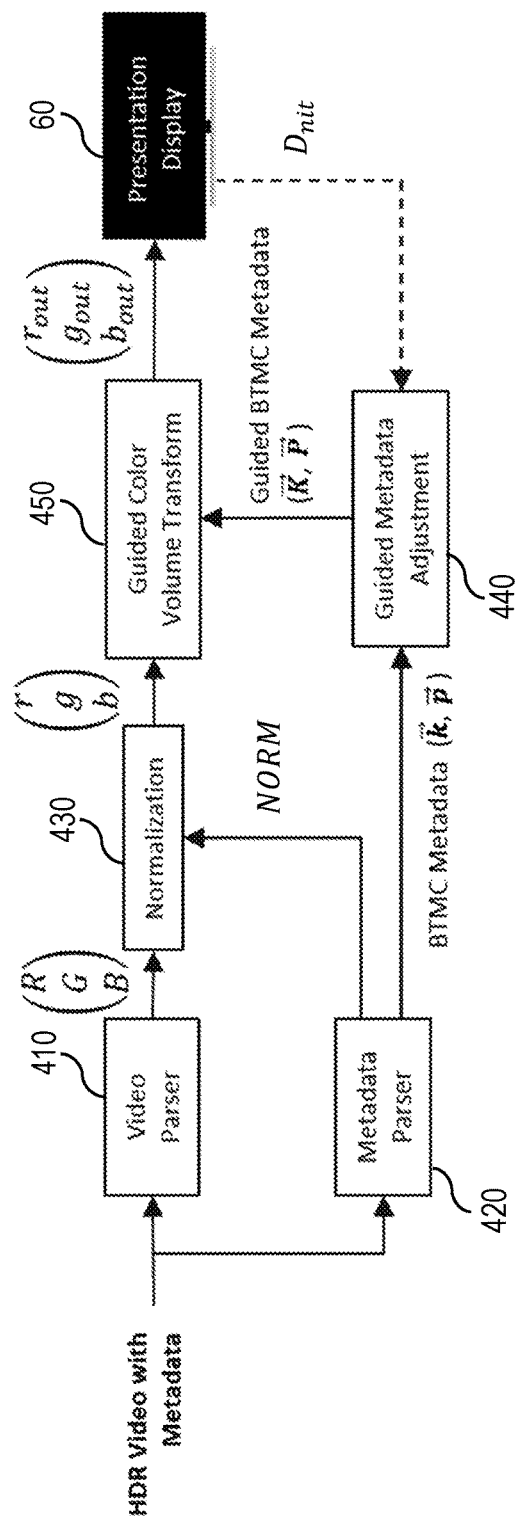
FIG. 7 illustrates another example tone mapping system implementing guided tone mapping of HDR video for presentation on a display device, in one or more embodiments.

FIG. 7 illustrates another example tone mapping system 400 implementing guided tone mapping of HDR video for presentation on a display device 60, in one or more embodiments. In one embodiment, the tone mapping system 190 in FIG. 3 is implemented as the tone mapping system 400. In one embodiment, the system 400 comprises a video parser unit 410 configured to: (1) receive, as input, a HDR video for presentation on a display device 60, wherein the HDR video is in a red, green, blue (RGB) color space (i.e., has a red color channel, a green color channel, and a blue color channel), and (2) parse the HDR video to produce a parsed HDR video $$\begin{pmatrix} R \\ G \\ B \end{pmatrix},$$

wherein R denotes a component of the red color channel, G denotes a component of the green color channel, and B denotes a component of the blue color channel.

In one embodiment, the system 400 comprises a metadata parser unit 420 configured to: (1) receive, as input, corresponding metadata for the HDR video, wherein the corresponding metadata comprises, for each scene of the HDR video, SSI and BTMC metadata ($\vec{k}$, $\vec{p}$) corresponding to the scene, and (2) parse the corresponding metadata to obtain a normalization factor NORM and respective BTMC metadata ($\vec{k}$, $\vec{p}$) corresponding to each scene of the HDR video. The system 400 receives the HDR video together with the corresponding metadata. Respective BTMC metadata ($\vec{k}$, $\vec{p}$) corresponding to each scene of the HDR video defines an incoming/input Bezier curve for tone mapping of the HDR video that is pre-designed for a specific target peak luminance level $T_{nit}$.

In one embodiment, the metadata parser unit 420 is configured to compute the normalization factor NORM based on SSI corresponding to each scene of the HDR video.

In one embodiment, the system 400 comprises a normalization unit 430 configured to: (1) receive the parsed HDR video $$\begin{pmatrix} R \\ G \\ B \end{pmatrix}$$

from the video parser unit 410, (2) receive the normalization factor NORM from the metadata parser unit 420, and (3) perform a normalization operation on the parsed HDR video $$\begin{pmatrix} R \\ G \\ B \end{pmatrix}$$

utilizing the normalization factor NORM to produce a normalized HDR video $$\begin{pmatrix} r \\ g \\ b \end{pmatrix},$$

wherein r denotes a normalized component of the red color channel, g denotes a normalized component of the green color channel, and b denotes a normalized component of the blue color channel.

In one embodiment, the system 400 comprises a guided metadata adjustment unit 440 configured to convert the incoming/input Bezier curve to an adjusted Bezier curve that fits a peak luminance level $D_{nit}$ of the display device 60 by adjusting respective BTMC metadata ($\vec{k}$, $\vec{p}$) corresponding to each scene of the HDR video to respective guided (i.e., adjusted) BTMC metadata ($\vec{K}$, $\vec{P}$) corresponding to the scene. Specifically, in one embodiment, the guided metadata adjustment unit 440 is configured to: (1) receive BTMC metadata ($\vec{k}$, $\vec{p}$) corresponding to a scene of the HDR video from the metadata parser unit 420, (2) receive the peak luminance level $D_{nit}$ of the display device 60 (e.g., from the display device 60 or as an input provided via an I/O unit 140), and (3) adjust the BTMC metadata ($\vec{k}$, $\vec{p}$) based on the peak luminance level $D_{nit}$ and the specific target peak luminance level $T_{nit}$ to produce the guided (i.e., adjusted) BTMC metadata ($\vec{K}$, $\vec{P}$) corresponding to the scene.

In one embodiment, the system 400 comprises a guided color volume transform unit 450 configured to: (1) receive the normalized HDR video $$\begin{pmatrix} r \\ g \\ b \end{pmatrix}$$

from the normalization unit 430, (2) receive guided BTMC metadata ($\vec{K}$, $\vec{P}$) corresponding to a scene of the HDR video from the guided metadata adjustment unit 440, and (3) perform, based on the guided BTMC metadata ($\vec{K}$, $\vec{P}$), a tone mapping operation on the normalized HDR video $$\begin{pmatrix} r \\ g \\ b \end{pmatrix}$$

to produce a tone mapped HDR video $$\begin{pmatrix} r_{out} \\ g_{out} \\ b_{out} \end{pmatrix},$$

wherein $r_{out}$ denotes a tone mapped component of the red color channel, $g_{out}$ denotes a tone mapped component of the green color channel, and $b_{out}$ denotes a tone mapped component of the blue color channel. In one embodiment, the resulting tone mapped HDR video $$\begin{pmatrix} r_{out} \\ g_{out} \\ b_{out} \end{pmatrix}$$

is provided, as output, to the display device 60 for presentation.

Figure 8:
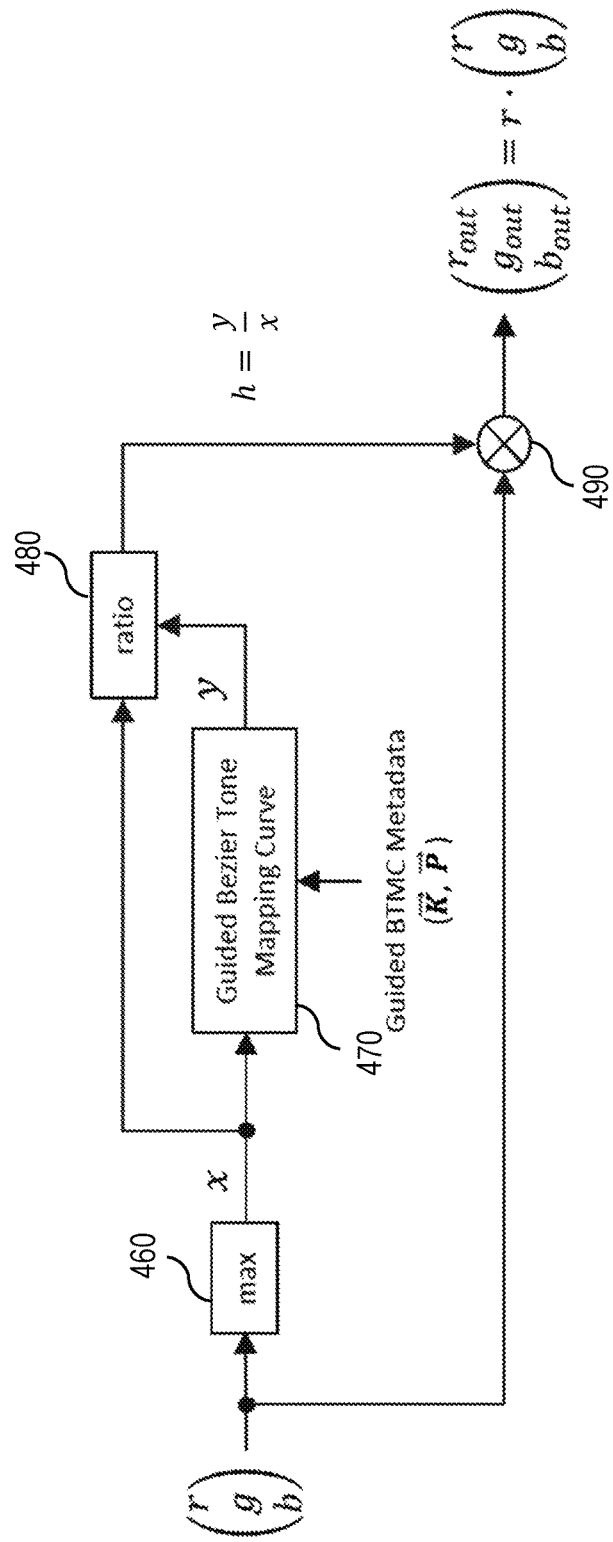
FIG. 8 illustrates an example guided color volume transform unit implemented by the tone mapping system in FIG. 7, in one or more embodiments.

FIG. 8 illustrates an example guided color volume transform unit 450 implemented by the tone mapping system 400 in FIG. 7, in one or more embodiments. In one embodiment, the guided color volume transform unit 450 comprises a max unit 460 configured to: (1) receive the normalized HDR video $$\begin{pmatrix} r \\ g \\ b \end{pmatrix}$$

from the normalization unit 430, and (2) convert the normalized HDR video $$\begin{pmatrix} r \\ g \\ b \end{pmatrix}$$

with multiple color channels to a normalized HDR video x with a single channel (i.e., normalized single-channel HDR video x).

In one embodiment, to convert the normalized HDR video $$\begin{pmatrix} r \\ g \\ b \end{pmatrix}$$

to the normalized single-channel HDR video x, the max unit 460 performs a color conversion operation on the normalized HDR video $$\begin{pmatrix} r \\ g \\ b \end{pmatrix}$$

in the RGB color space to produce a normalized single-channel HDR video $l_y$ in a grayscale color space. In some embodiments, the color conversion operation performed by the max unit 460 is expressed in accordance with equation (12) provided below:

$$l_y = (w_r \ w_b \ w_g) \cdot \begin{pmatrix} r \\ g \\ b \end{pmatrix}, \quad (12)$$

wherein $(w_r, w_b, w_g)$ are weights that satisfy the following constraints: (1) $w_r + w_b + w_g = 1$, and (2) $0 \leq w_r, w_g, w_b \leq 1$. The max unit 460 also converts the normalized HDR video $$\begin{pmatrix} r \\ g \\ b \end{pmatrix}$$

in the RGB color space to a normalized single-channel HDR video $l_m$, wherein $l_m = \max(r,g,b)$. The max unit 460 then performs a blending operation using the normalized single-channel HDR video $l_y$ and the normalized single-channel HDR video $l_m$ to produce the normalized single-channel HDR video x. In some embodiments, the blending operation performed by the max unit 460 is expressed in accordance with equation (13) provided below:

$$x = \theta l_y + (1-\theta) l_m \quad (13),$$

wherein $0 \leq \theta \leq 1$, and $\theta$ is one of a pre-determined value, a fixed value, or an adaptively determined value (e.g., based on an adaptive filter or a non-linear function that maps difference $l_m - l_y$ difference to range [0,1]).

In one embodiment, the guided color volume transform unit 450 comprises a guided BTMC unit 470 configured to: (1) receive the normalized single-channel HDR video x from the max unit 460, (2) receive guided BTMC metadata ($\vec{K}$, $\vec{P}$) corresponding to a scene of the HDR video from the guided metadata adjustment unit 440, and (3) perform, based on the guided BTMC metadata ($\vec{K}$, $\vec{P}$), a tone mapping operation on the normalized single-channel HDR video x to produce a HDR video y. Unlike the BTMC unit 50 in FIG. 1, the guided BTMC unit 470 utilizes a Bezier curve B(t) that fits the peak luminance level $D_{nit}$ of the display device 60.

In one embodiment, the guided color volume transform unit 450 comprises a ratio unit 480 configured to: (1) receive the normalized single-channel HDR video x from the max unit 460, (2) receive the HDR video y from the guided BTMC unit 470, and (2) compute a ratio h based on the normalized single-channel HDR video x and the HDR video y, wherein $$h = \frac{y}{x}.$$

In one embodiment, the guided color volume transform unit 450 comprises a dot product unit 490 configured to: (1) receive the normalized HDR video $$\begin{pmatrix} r \\ g \\ b \end{pmatrix}$$

from the normalization unit 430, (2) receive the ratio h from ratio unit 480, and (3) compute a dot product of the ratio h and the normalized HDR video $$\begin{pmatrix} r \\ g \\ b \end{pmatrix}$$

to produce the tone mapped HDR video $$\begin{pmatrix} r_{out} \\ g_{out} \\ b_{out} \end{pmatrix},$$

wherein $$\begin{pmatrix} r_{out} \\ g_{out} \\ b_{out} \end{pmatrix} = h \cdot \begin{pmatrix} r \\ g \\ b \end{pmatrix}.$$

In one embodiment, the system 400 may include a component (not shown) configured to: (1) receive the tone mapped HDR video $$\begin{pmatrix} r_{out} \\ g_{out} \\ b_{out} \end{pmatrix}$$

from the guided color volume transform unit 450, (2) receive the peak luminance level $D_{nit}$ of the display device 60 (e.g., directly from the display device 60 or indirectly as an input provided via an I/O unit 140), and (3) perform a de-normalization operation on the tone mapped HDR video $$\begin{pmatrix} r_{out} \\ g_{out} \\ b_{out} \end{pmatrix}$$

utilizing the peak luminance level $D_{nit}$ to produce a de-normalized tone mapped HDR video $$\begin{pmatrix} R_{out} \\ G_{out} \\ B_{out} \end{pmatrix},$$

wherein $R_{out}$ denotes a de-normalized tone mapped component of the red color channel, $G_{out}$ denotes a de-normalized tone mapped component of the green color channel, and $B_{out}$ denotes a de-normalized tone mapped component of the blue color channel. In some embodiments, the de-normalized tone mapped HDR video $$\begin{pmatrix} R_{out} \\ G_{out} \\ B_{out} \end{pmatrix}$$

is in a standard format/range of HDR (e.g., the standard range of HDR may be 0 to 10,000 nits for HDR video comprising a Perceptual Quantizer (PQ) signal).

In one embodiment, if the display device 60 is only capable of mapping a normalized signal received as input to a range [0, $D_{nit}$] and is neither aware of nor capable of understanding the standard format/range of HDR, the system 400 need not perform the de-normalization operation; instead, the system provides, as output, the tone mapped HDR video $$\begin{pmatrix} r_{out} \\ g_{out} \\ b_{out} \end{pmatrix}$$

to the display device 60 for presentation. If the display device 60 is aware of or capable of understanding the standard format/range of HDR, the system 400 performs the de-normalization operation and provides, as output, the de-normalized tone mapped HDR video $$\begin{pmatrix} R_{out} \\ G_{out} \\ B_{out} \end{pmatrix}$$

to the display device 60 for presentation. For example, in one embodiment, if the display device 60 is a full TV display that is aware of or capable of understanding the standard format/range of HDR and the system 400 is implemented in one or more components separate from the full TV display, the system 400 may stream the de-normalized tone mapped HDR video $$\begin{pmatrix} R_{out} \\ G_{out} \\ B_{out} \end{pmatrix}$$

to the full TV display.

Figure 9:
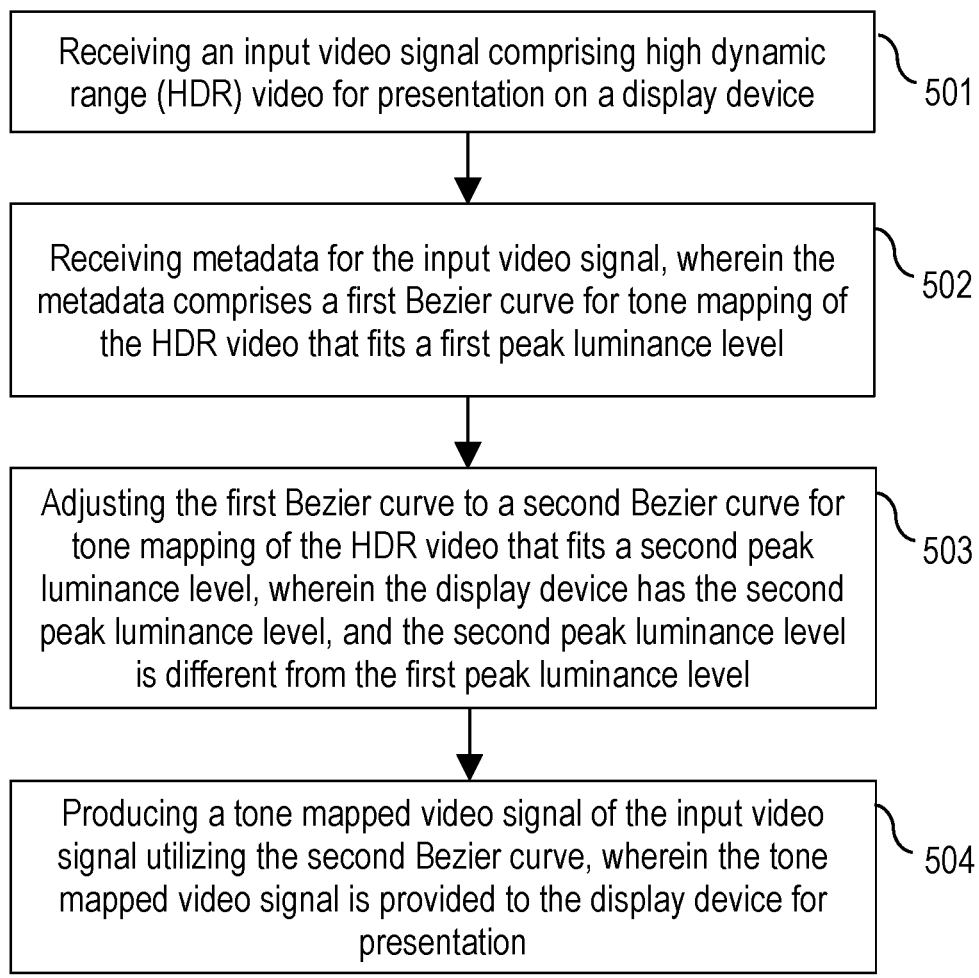
FIG. 9 is a flowchart of an example process for implementing guided tone mapping of HDR video for presentation on a display device, in one or more embodiments.

FIG. 9 is a flowchart of an example process 500 for implementing guided tone mapping of HDR video for presentation on a display device, in one or more embodiments. Process block 501 includes receiving an input video signal comprising HDR video for presentation on a display device. Process block 502 includes receiving metadata for the input video signal, wherein the metadata comprises a first Bezier curve for tone mapping of the HDR video that fits a first peak luminance level. Process block 503 includes adjusting the first Bezier curve to a second Bezier curve for tone mapping of the HDR video that fits a second peak luminance level, wherein the display device has the second peak luminance level, and the second peak luminance level is different from the first peak luminance level. Process block 504 includes producing a tone mapped video signal of the input video signal utilizing the second Bezier curve, wherein the tone mapped video signal is provided to the display device for presentation.

In one embodiment, process blocks 501-504 may be performed by one or more components of the tone mapping system 200 or 400.

Figure 10:
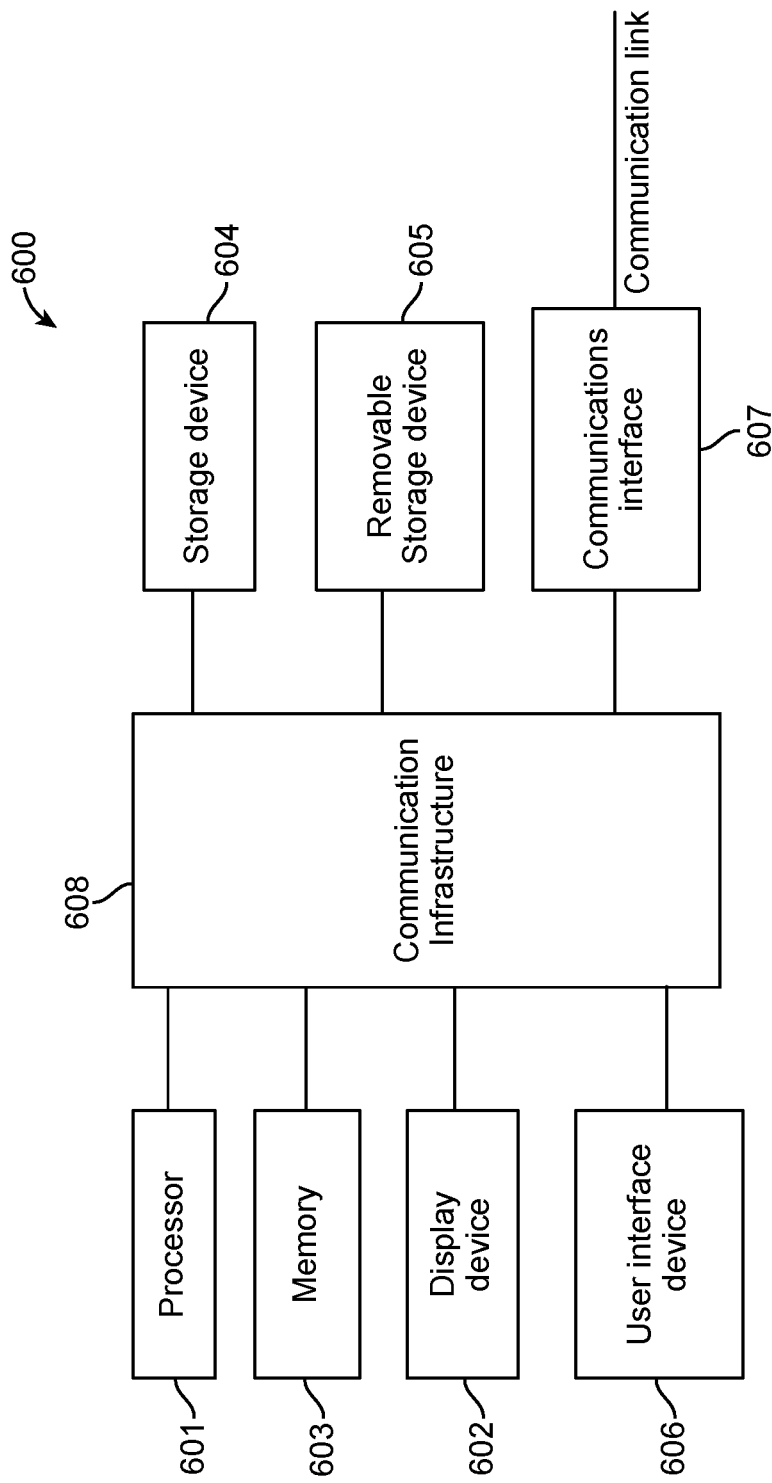
FIG. 10 is a high-level block diagram showing an information processing system comprising a computer system useful for implementing the disclosed embodiments.

FIG. 10 is a high-level block diagram showing an information processing system comprising a computer system 600 useful for implementing the disclosed embodiments. The systems 190, 200, and 400 may be incorporated in the computer system 600. The computer system 600 includes one or more processors 601, and can further include an electronic display device 602 (for displaying video, graphics, text, and other data), a main memory 603 (e.g., random access memory (RAM)), storage device 604 (e.g., hard disk drive), removable storage device 605 (e.g., removable storage drive, removable memory module, a magnetic tape drive, optical disk drive, computer readable medium having stored therein computer software and/or data), viewer interface device 606 (e.g., keyboard, touch screen, keypad, pointing device), and a communication interface 607 (e.g., modem, a network interface (such as an Ethernet card), a communications port, or a PCMCIA slot and card). The communication interface 607 allows software and data to be transferred between the computer system and external devices. The system 600 further includes a communications infrastructure 608 (e.g., a communications bus, cross-over bar, or network) to which the aforementioned devices/modules 601 through 607 are connected.

Information transferred via communications interface 607 may be in the form of signals such as electronic, electromagnetic, optical, or other signals capable of being received by communications interface 607, via a communication link that carries signals and may be implemented using wire or cable, fiber optics, a phone line, a cellular phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to generate a computer implemented process. In one embodiment, processing instructions for process 500 (FIG. 9) may be stored as program instructions on the memory 603, storage device 604, and/or the removable storage device 605 for execution by the processor 601.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the invention.

Though the embodiments have been described with reference to certain versions thereof; however, other versions are possible. Therefore, the spirit and scope of the appended claims should not be limited to the description of the preferred versions contained herein.

What is claimed is:

1. A method comprising:
   receiving an input video signal comprising high dynamic range (HDR) video for presentation on a display device;
   receiving metadata for the input video signal, wherein the metadata comprises a first Bezier curve for tone mapping of the HDR video, and the first Bezier curve fits a pre-determined target peak luminance level;
   converting the first Bezier curve to a second Bezier curve for tone mapping of the HDR video, wherein the second Bezier curve fits a peak luminance level of the display device, and the peak luminance level of the display device is different from the pre-determined target peak luminance level; and
   producing a tone mapped video signal of the input video signal utilizing the second Bezier curve, wherein the tone mapped video signal is provided to the display device for presentation.

2. The method of claim 1, wherein:
   the HDR video comprises one or more scenes; and
   the metadata comprises, for each scene of the HDR video, a knee point and a vector of Bezier curve anchors corresponding to the scene.

3. The method of claim 2, wherein converting the first Bezier curve to a second Bezier curve for tone mapping of the HDR video comprises:
   for each scene of the HDR video, adjusting a knee point and a vector of Bezier curve anchors corresponding to the scene based on a comparison of the pre-determined target peak luminance level against the peak luminance level of the display device.

4. The method of claim 3, wherein producing a tone mapped video signal of the input video signal utilizing the second Bezier curve comprises:
   based on each adjusted knee point and each adjusted vector of Bezier curve anchors, performing a tone mapping operation on a normalized version of the HDR video to produce the tone mapped video signal.

5. The method of claim 4, wherein producing a tone mapped video signal of the input video signal utilizing the second Bezier curve further comprises:
   reducing occurrence of one or more banding artifacts in the tone mapped video signal around each adjusted knee point by maintaining continuity of slope of the second Bezier curve at the adjusted knee point.

6. The method of claim 4, wherein the HDR video comprises multiple channels.

7. The method of claim 6, wherein producing a tone mapped video signal of the input video signal utilizing the second Bezier curve further comprises:
   converting the normalized version of the HDR video to a single channel.

8. A system comprising:
   at least one processor; and
   a non-transitory processor-readable memory device storing instructions that when executed by the at least one processor causes the at least one processor to perform operations including:
      receiving an input video signal comprising high dynamic range (HDR) video for presentation on a display device;
      receiving metadata for the input video signal, wherein the metadata comprises a first Bezier curve for tone mapping of the HDR video, and the first Bezier curve fits a pre-determined target peak luminance level;

converting the first Bezier curve to a second Bezier curve for tone mapping of the HDR video, wherein the second Bezier curve fits a peak luminance level of the display device, and the peak luminance level of the display device is different from the pre-determined target peak luminance level; and producing a tone mapped video signal of the input video signal utilizing the second Bezier curve, wherein the tone mapped video signal is provided to the display device for presentation.

9. The system of claim 8, wherein:

the HDR video comprises one or more scenes; and the metadata comprises, for each scene of the HDR video, a knee point and a vector of Bezier curve anchors corresponding to the scene.

10. The system of claim 9, wherein converting the first Bezier curve to a second Bezier curve for tone mapping of the HDR video comprises:

for each scene of the HDR video, adjusting a knee point and a vector of Bezier curve anchors corresponding to the scene based on a comparison of the pre-determined target peak luminance level against the peak luminance level of the display device.

11. The system of claim 10, wherein producing a tone mapped video signal of the input video signal utilizing the second Bezier curve comprises:

based on each adjusted knee point and each adjusted vector of Bezier curve anchors, performing a tone mapping operation on a normalized version of the HDR video to produce the tone mapped video signal.

12. The method of claim 11, wherein producing a tone mapped video signal of the input video signal utilizing the second Bezier curve further comprises:

reducing occurrence of one or more banding artifacts in the tone mapped video signal around each adjusted knee point by maintaining continuity of slope of the second Bezier curve at the adjusted knee point.

13. The method of claim 11, wherein the HDR video comprises multiple channels.

14. The method of claim 13, wherein producing a tone mapped video signal of the input video signal utilizing the second Bezier curve further comprises:

converting the normalized version of the HDR video to a single channel.

15. A non-transitory processor-readable medium that includes a program that when executed by a processor performs a method comprising:

receiving an input video signal comprising high dynamic range (HDR) video for presentation on a display device;

receiving metadata for the input video signal, wherein the metadata comprises a first Bezier curve for tone mapping of the HDR video, and the first Bezier curve fits a pre-determined target peak luminance level;

converting the first Bezier curve to a second Bezier curve for tone mapping of the HDR video, wherein the second Bezier curve fits a peak luminance level of the display device, and the peak luminance level of the display device is different from the pre-determined target peak luminance level; and producing a tone mapped video signal of the input video signal utilizing the second Bezier curve, wherein the tone mapped video signal is provided to the display device for presentation.

16. The non-transitory processor-readable medium of claim 15, wherein:

the HDR video comprises one or more scenes; and the metadata comprises, for each scene of the HDR video, a knee point and a vector of Bezier curve anchors corresponding to the scene.

17. The non-transitory processor-readable medium of claim 16, wherein converting the first Bezier curve to a second Bezier curve for tone mapping of the HDR video comprises:

for each scene of the HDR video, adjusting a knee point and a vector of Bezier curve anchors corresponding to the scene based on a comparison of the pre-determined target peak luminance level against the peak luminance level of the display device.

18. The non-transitory processor-readable medium of claim 17, wherein producing a tone mapped video signal of the input video signal utilizing the second Bezier curve comprises:

based on each adjusted knee point and each adjusted vector of Bezier curve anchors, performing a tone mapping operation on a normalized version of the HDR video to produce the tone mapped video signal.

19. The non-transitory processor-readable medium of claim 18, wherein producing a tone mapped video signal of the input video signal utilizing the second Bezier curve further comprises:

reducing occurrence of one or more banding artifacts in the tone mapped video signal around each adjusted knee point by maintaining continuity of slope of the second Bezier curve at the adjusted knee point.

20. The non-transitory processor-readable medium of claim 18, wherein the HDR video comprises multiple channels, and producing a tone mapped video signal of the input video signal utilizing the second Bezier curve further comprises:

converting the normalized version of the HDR video to a single channel.

* * * * *